US010606214B2

(12) United States Patent
Nam et al.

(10) Patent No.: US 10,606,214 B2
(45) Date of Patent: Mar. 31, 2020

(54) METHOD AND APPARATUS FOR MEASURING AND EVALUATING SPATIAL RESOLUTION OF HOLOGRAM RECONSTRUCTED IMAGE

(71) Applicant: ELECTRONICS AND TELECOMMUNICATIONS RESEARCH INSTITUTE, Daejeon (KR)

(72) Inventors: Jeho Nam, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 48 days.

(21) Appl. No.: 15/987,704

(22) Filed: May 23, 2018

(65) Prior Publication Data

US 2018/0341222 A1 Nov. 29, 2018

(30) Foreign Application Priority Data

May 23, 2017 (KR) .......................... 10-2017-0063705

(51) Int. Cl.
*G03H 1/22* (2006.01)
*H04N 17/04* (2006.01)

(52) U.S. Cl.
CPC ......... *G03H 1/2202* (2013.01); *G03H 1/2294* (2013.01); *H04N 17/04* (2013.01);
(Continued)

(58) Field of Classification Search
CPC ......... G06T 15/00; G06T 15/08; G06T 17/00; G06T 19/00; G06T 2207/00; G06T 2200/04
See application file for complete search history.

(56) References Cited

U.S. PATENT DOCUMENTS 5,532,814 A * 7/1996 Cha .......................... G01P 3/366
356/28
5,684,612 A * 11/1997 Wilde ................... G02F 1/0338
359/25

(Continued)

FOREIGN PATENT DOCUMENTS

KR 10-2012-0054182 A 5/2012
KR 10-2016-0019308 A 2/2016

*Primary Examiner* — Pankaj Kumar
*Assistant Examiner* — Timothy R Newlin

(57) ABSTRACT

An apparatus for measuring a spatial resolution of a hologram reconstructed image optically reconstructed on a space is provided. The apparatus for measuring a spatial resolution of a hologram reconstructed image includes: a measuring unit measuring first spatial frequency resolving powers for a horizontal direction of the hologram reconstructed image and second spatial frequency resolving powers for a vertical direction of the hologram reconstructed image at first spatial positions having a predetermined interval in horizontal and vertical directions within a viewing angle range of the hologram reconstructed image; and an evaluating unit evaluating the spatial resolution of the hologram reconstructed image using the first spatial frequency resolving powers and the second spatial frequency resolving powers measured at each of the first spatial positions.

19 Claims, 11 Drawing Sheets

(52) U.S. Cl.
CPC . *G03H 2001/2247* (2013.01); *G03H 2226/02* (2013.01); *G03H 2240/56* (2013.01)

(56) References Cited

U.S. PATENT DOCUMENTS

| | | | | |
|---|---|---|---|---|
| 6,014,219 | A * | 1/2000 | Yamate | G03H 1/00 356/394 |
| 6,038,042 | A * | 3/2000 | Takemori | G03H 1/08 359/33 |
| 6,819,469 | B1 * | 11/2004 | Koba | G03F 7/70291 359/290 |
| 6,847,480 | B2 * | 1/2005 | Steenblik | G02B 21/0008 359/368 |
| 9,081,200 | B2 | 7/2015 | Kim | |
| 9,500,470 | B2 | 11/2016 | Lee et al. | |
| 2003/0007204 | A1 * | 1/2003 | Ashizaki | G03H 1/268 359/23 |
| 2004/0021917 | A1 * | 2/2004 | Plesniak | G03H 1/0808 359/9 |
| 2006/0164703 | A1 * | 7/2006 | Coppola | G03H 1/0841 359/15 |
| 2008/0018966 | A1 * | 1/2008 | Dubois | G01B 9/021 359/9 |
| 2009/0219591 | A1 * | 9/2009 | Cable | G03B 21/14 359/9 |
| 2009/0322738 | A1 * | 12/2009 | Cable | G03H 1/0808 345/419 |
| 2010/0033782 | A1 * | 2/2010 | Olaya | G02B 27/0093 359/9 |
| 2010/0067077 | A1 * | 3/2010 | Kroll | G03H 1/2205 359/22 |
| 2010/0149139 | A1 * | 6/2010 | Kroll | G02B 26/0875 345/204 |
| 2011/0310447 | A1 * | 12/2011 | Kim | G03H 1/0808 359/9 |
| 2012/0019883 | A1 * | 1/2012 | Chae | G03H 1/02 359/11 |
| 2013/0162637 | A1 * | 6/2013 | Son | G03H 1/08 345/419 |
| 2013/0258091 | A1 * | 10/2013 | Ozcan | G06K 9/0014 348/79 |
| 2014/0065520 | A1 * | 3/2014 | Tsang | G03H 1/02 430/2 |
| 2014/0268264 | A1 * | 9/2014 | Lee | G03H 1/2294 359/21 |
| 2015/0192898 | A1 * | 7/2015 | Nam | G03H 1/2205 359/9 |
| 2015/0268630 | A1 * | 9/2015 | Azzazy | G03H 1/0443 359/11 |
| 2015/0323900 | A1 * | 11/2015 | Oh | G03H 1/0476 359/9 |
| 2016/0103321 | A1 * | 4/2016 | An | G02B 27/225 348/40 |
| 2016/0259297 | A1 * | 9/2016 | Sato | G02B 21/365 |
| 2017/0024890 | A1 | 1/2017 | Yoon | |
| 2017/0090419 | A1 * | 3/2017 | Kim | G03H 1/0891 |

* cited by examiner

HORIZONTAL RESOLVING POWER MEASURING INPUT
PATTERN (LEFT) AND PHOTOGRAPHING RESULT (RIGHT)

FIG. 7A
FIG. 7B
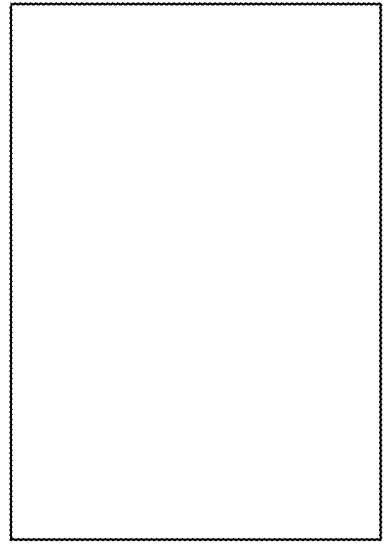
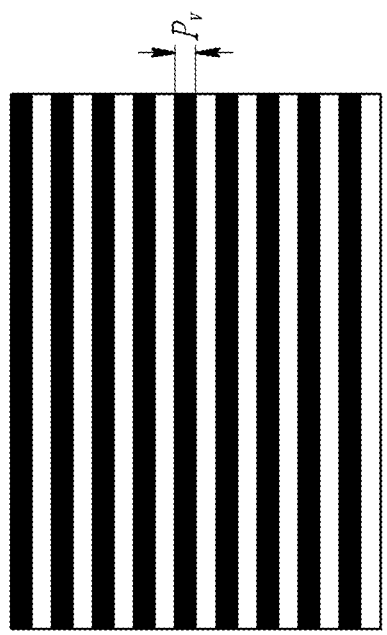
(a)                 (b)
VERTICAL RESOLVING POWER MEASURING INPUT
PATTERN (LEFT) AND PHOTOGRAPHING RESULT (RIGHT)

METHOD AND APPARATUS FOR MEASURING AND EVALUATING SPATIAL RESOLUTION OF HOLOGRAM RECONSTRUCTED IMAGE

CROSS-REFERENCE TO RELATED APPLICATION

This application claims priority to and the benefit of Korean Patent Application No. 10-2017-0063705 filed in the Korean Intellectual Property Office on May 23, 2017, the entire contents of which are incorporated herein by reference.

BACKGROUND OF THE INVENTION

(a) Field of the Invention

The present invention relates to a method and an apparatus for measuring a spatial resolution of a hologram reconstructed image and evaluating a quality of the hologram reconstructed image.

(b) Description of the Related Art

A holography technology is a three-dimensional stereoscopic image reconstruction technology of reconstructing a three-dimensional object on a space to provide a natural three-dimensional effect to an observer. The holography technology may solve a representation limitation such as focus-convergence mismatch, or the like, occurring in an existing stereo manner.

Particularly, a digital holography technology uses an optoelectronic device and a computer. In detail, the digital holography technology applies an optical diffraction and interference principle to stereoscopic information on a three-dimensional object and a real image to generate a computer-generated hologram (CGH). Then, the digital holograph technology may reconstruct a stereoscopic image as if an object exists on a space, by an optical display method.

A size, brightness, a resolution, sharpness, noise, a viewing angle, a stereoscopic depth, and the like, of a hologram reconstructed image may be considered as main elements defining a quality of a three-dimensional stereoscopic image reconstructed on the space through optical reconstruction of the hologram. Among them, the resolution is an image quality element most universally utilized in order to evaluate an image quality of a two-dimensional (2D) image. Generally, a resolution of a two-dimensional display apparatus (for example, a television (TV) screen, a computer monitor, or the like) is represented by the total number of pixels indicating precision of a display screen. In the case of a full high definition (HD) TV, a screen consists of 1920 pixels and 1080 pixels disposed, respectively, in horizontal and vertical directions, such as (1,920×1,080). Here, each pixel is a minimum basic unit of information display addressable in order to display individual brightness (luminance) or color. As the number of pixels of the display screen is increased, more detailed information may be provided, and image information having a higher resolution may thus be represented.

Meanwhile, evaluation of an image quality of the hologram reconstructed image imaged on the space through the optical reconstruction of the hologram, in terms of a resolution, is very different from a resolution depending on the number of pixels of a general 2D display.

In an optical reconstruction process of the hologram, diffracted light is propagated in a wave optics manner depending on patterns recorded in hologram data through a spatial light modulator (SLM), which is a core function element of a holographic display. An image is displayed through wavefronts formed on the space by the diffracted light.

That is, since the hologram reconstructed image is represented through continuous wavefronts on the space, pixels of a general display do not exist. Therefore, the resolution of the hologram reconstructed image is different from the resolution depending on the number of pixels of the 2D display.

In order to represent the resolution of the hologram reconstructed image optically reconstructed on the space unlike the conventional display resolution defined by the number of pixels that may be easily measured in the horizontal and vertical directions, a conceptual approach and definition different from the conventional art are required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide to a method and an apparatus for measuring a spatial resolution of a hologram reconstructed image provided by a holographic display (or a holographic display apparatus) having advantages of efficiently measuring the spatial resolution of the hologram reconstructed image.

Further, the present invention has been made in an effort to provide a method and an apparatus for evaluating a quality of a hologram reconstructed image.

An exemplary embodiment of the present invention provides an apparatus for measuring a spatial resolution of a hologram reconstructed image optically reconstructed on a space. The apparatus for measuring a spatial resolution of a hologram reconstructed image includes: a measuring unit measuring first spatial frequency resolving powers for a horizontal direction of the hologram reconstructed image and second spatial frequency resolving powers for a vertical direction of the hologram reconstructed image at first spatial positions having a predetermined interval in horizontal and vertical directions within a viewing angle range of the hologram reconstructed image; and an evaluating unit evaluating the spatial resolution of the hologram reconstructed image using the first spatial frequency resolving powers and the second spatial frequency resolving powers measured at each of the first spatial positions.

Spatial phase-shift in the horizontal and vertical directions may be applied to first hologram data corresponding to the hologram reconstructed image.

The measuring unit may average first contrast modulation values corresponding to the first spatial frequency resolving powers measured at each of the first spatial positions to obtain a first average value.

The measuring unit may measure third spatial frequency resolving powers for the horizontal direction of the hologram reconstructed image and fourth spatial frequency resolving powers for the vertical direction of the hologram reconstructed image, with respect to each of a plurality of reconstructed distances of the hologram reconstructed image.

The measuring unit may average first contrast modulation values corresponding to the third spatial frequency resolving powers measured with respect to each of the plurality of reconstructed distances to obtain a first average value.

The evaluating unit may linearly interpolate a modulation transfer function indicating a relationship between spatial frequencies and contrast modulation using the first average value to obtain a first function, and obtain a first effective spatial frequency corresponding to a preset target contrast modulation value using the first function.

The evaluating unit may calculate an average $p_m$ and a standard deviation $p_\delta$ of the spatial frequencies using the first contrast modulation values for each of the first spatial positions, and The first effective spatial frequency may exist in a section of $[p_m-kp_\delta, p_m+kp_\delta]$ (here, k is a constant).

The evaluating unit may evaluate the spatial resolution of the hologram reconstructed image using a resolution of a spatial light modulator included in a holographic display apparatus reconstructing the hologram reconstructed image and the first effective spatial frequency.

Another exemplary embodiment of the present invention provides a method for measuring a spatial resolution of a hologram reconstructed image optically reconstructed on a space by an apparatus for measuring a spatial resolution. The method for measuring a spatial resolution of a hologram reconstructed image includes: measuring first spatial frequency resolving powers for a horizontal direction of the hologram reconstructed image at spatial positions having a predetermined interval in at least one of horizontal and vertical directions within a viewing angle range of the hologram reconstructed image; obtaining a first function having a relationship between spatial frequencies and contrast modulation using the first spatial frequency resolving powers measured at each of the spatial positions; and evaluating a first spatial resolution for the horizontal direction of the hologram reconstructed image using the first function.

The measuring may include averaging first contrast modulation values corresponding to the first spatial frequency resolving powers measured at each of the spatial positions to obtain a first average value.

The obtaining of the first function may include linearly interpolating a modulation transfer function using the first average value to obtain the first function.

The evaluating of the first spatial resolution may include: obtaining a first effective spatial frequency corresponding to a preset target contrast modulation value using the first function; and calculating the first spatial resolution using a resolution, in the horizontal direction, of a spatial light modulator belonging to a holographic display apparatus reconstructing the hologram reconstructed image and the first effective spatial frequency.

The method for measuring a spatial resolution of a hologram reconstructed image may further include: measuring second spatial frequency resolving powers for the horizontal direction of the hologram reconstructed image with respect to each of a plurality of reconstructed distances of the hologram reconstructed image; and averaging first contrast modulation values corresponding to the second spatial frequency resolving powers measured with respect to each of the plurality of reconstructed distances to obtain a first average value.

Yet another exemplary embodiment of the present invention provides an apparatus for measuring a spatial resolution of a hologram reconstructed image optically reconstructed on a space. The apparatus for measuring a spatial resolution of a hologram reconstructed image includes: a measuring unit measuring first spatial frequency resolving powers for a horizontal direction of the hologram reconstructed image with respect to each of a plurality of reconstructed distances of the hologram reconstructed image; and an evaluating unit obtaining a first function having a relationship between spatial frequencies and contrast modulation using the first spatial frequency resolving powers measured with respect to each of the plurality of reconstructed distances and evaluating a first spatial resolution for the horizontal direction of the hologram reconstructed image using the first function.

The measuring unit may average first contrast modulation values corresponding to the first spatial frequency resolving powers measured with respect to each of the plurality of reconstructed distances to obtain a first average value.

The evaluating unit may linearly interpolate a modulation transfer function using the first average value to obtain the first function.

According to an exemplary embodiment of the present invention, the method and the apparatus for measuring a spatial resolution of a hologram reconstructed image and the method and the apparatus for evaluating a spatial resolution of a hologram reconstructed image are provided.

In addition, according to an exemplary embodiment of the present invention, a resolution, in horizontal and vertical directions, of a three-dimensional stereoscopic image optically reconstructed from hologram data may be measured.

Further, according to an exemplary embodiment of the present invention, the resolution of the three-dimensional stereoscopic image in the horizontal and vertical directions may be compared with a resolution of a spatial light modulator (SLM) of a holographic display apparatus to objectively evaluate an image quality of a hologram reconstructed image of the holographic display apparatus.

Further, according to an exemplary embodiment of the present invention, the image quality of the hologram reconstructed image evaluated and analyzed as described above may be effectively utilized to evaluate performance of the spatial light modulator (SLM) of the holographic display apparatus.

Further, according to an exemplary embodiment of the present invention, the image quality of the hologram reconstructed image evaluated and analyzed as described above may also be effectively utilized to evaluate performance of an optical apparatus of the holographic display apparatus.

BRIEF DESCRIPTION OF THE DRAWINGS

FIGS. 7A and 7B are views illustrating vertical resolving power measuring input patterns for measuring a vertical spatial frequency resolving power and a photographing result image for the vertical resolving power measuring input patterns, according to an exemplary embodiment of the present invention.

DETAILED DESCRIPTION OF THE EMBODIMENTS

Figure 1:
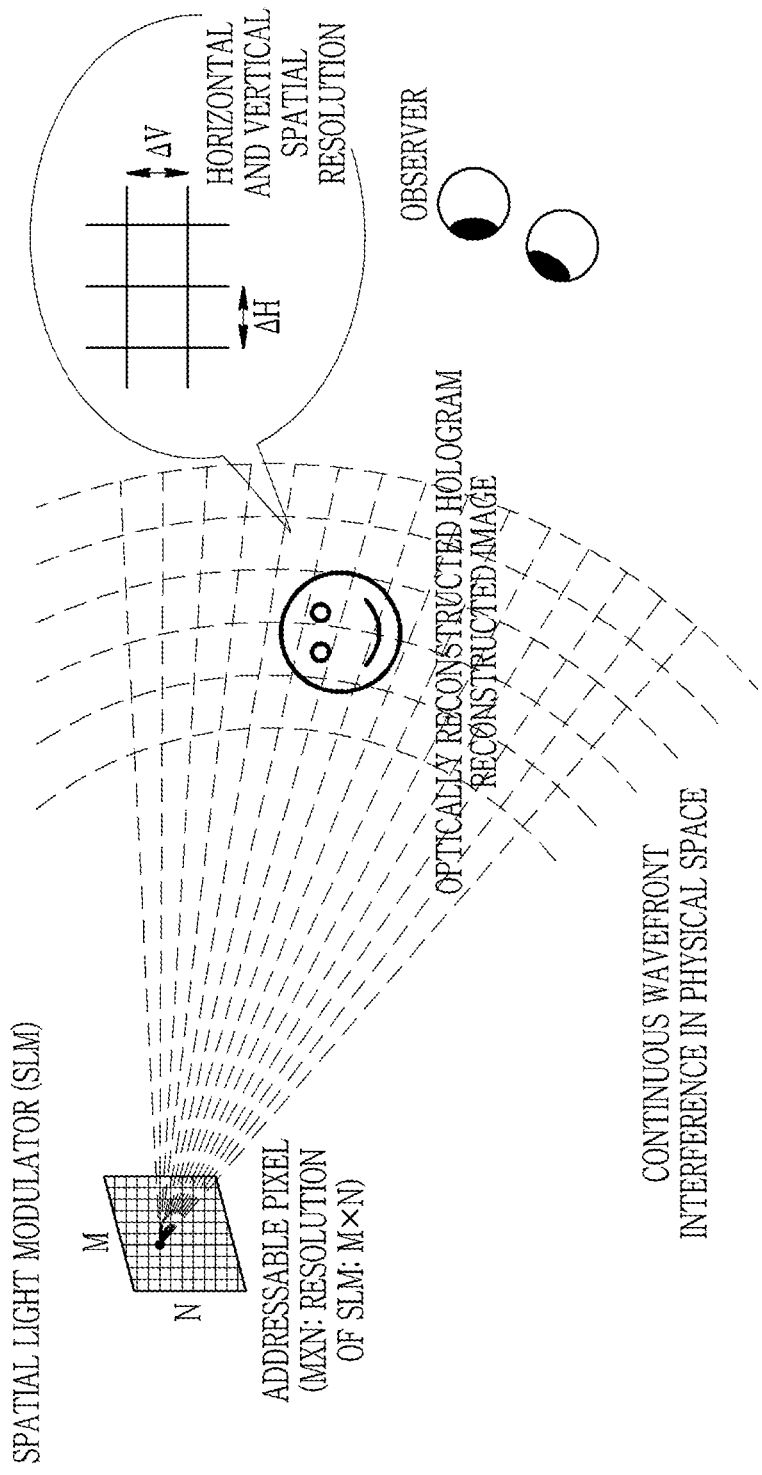
FIG. 1 is a view illustrating a hologram reconstructed image optically reconstructed on a space by a holographic display.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, an overlapping description for the same components is omitted.

Further, in the present specification, it is to be understood that when one component is referred to as being 'connected to' another component, it may be connected directly to another component or be connected to another component with the other component interposed therebetween. On the other hand, in the present specification, it is to be understood that when one component is referred to as being 'directly connected to' another component, it may be connected to another component without the other component interposed therebetween.

In addition, terms used in the present specification are used only in order to describe specific exemplary embodiments rather than limiting the present invention.

Further, in the present specification, singular forms are intended to include plural forms unless the context clearly indicates otherwise.

Further, it will be understood that the terms 'include' or 'have' used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

Further, in the present specification, a term ¡®and/or¡¯ includes a combination of a plurality of stated items or any one of the plurality of stated items. In the present specification, CA or B' may include 'A', 'B', or 'both of A and B'.

Hereinafter, a method, an apparatus, and a system for measuring and evaluating a quality of a hologram reconstructed image reconstructed through optical reconstruction of a hologram will be described. In detail, the method, the apparatus, and the system according to an exemplary embodiment of the present invention measure a resolution of the hologram reconstructed image in horizontal and vertical directions, compare and calculates the measured resolution with resolution information of a spatial light modulator (SLM) used in order to optically reconstruct the hologram, and evaluate a reconstructed quality of the hologram reconstructed image according to a compared and calculated result. In the present specification, the hologram reconstructed image means a hologram reconstructed image.

In order to define a resolution representing an image quality of a stereoscopic image existing on a continuous wavefront space, such as the hologram reconstructed image, a 'resolving power' concept, which is an original meaning of the resolution, is used. In detail, with respect to dots (or lines), which are minimum representation elements constituting the hologram reconstructed image, a spatial resolution of the hologram reconstructed image may be defined on the basis of a resolving power to distinguish adjacent dots (or lines) from each other. The spatial resolution means how detailed the hologram reconstructed image is represented on the space, and a spatial resolving power means a power to distinguish a very small spatial difference.

In defining the resolution of the hologram reconstructed image, depth reconstruction of a three-dimensional image, which is a representative feature of the hologram, is considered. In detail, in a concept including the entirety of a predetermined hologram reconstruction space rather than a specific position on a space, the resolution of the hologram reconstructed image is handled. Therefore, average resolution information of the entire space as well as a resolution at a specific position on the entire space on which the hologram is reconstructed may be provided.

In addition, in defining the resolution of the hologram reconstructed image, a continuous motion parallax, which is a feature of the hologram, is considered. In detail, resolution information at any viewpoint within a viewing angle range having a predetermined viewing angle as well as a depth (or a distance) on the space may be provided.

A method and an apparatus for effectively measuring a spatial resolution, in horizontal and vertical directions, of a hologram reconstructed image observed at any viewpoint within a viewing angle range having a continuous (motion) parallax together with different depths (distances) provided by a holographic display (or a holographic display apparatus) are described. In addition, a method and an apparatus for measuring and evaluating a spatial resolution-based image quality of a three-dimensional image reconstructed by a hologram are described.

As described above, the resolution concept of the hologram reconstructed image is different from the number of addressable pixels that may be easily measured in the conventional display. However, the resolution of the hologram reconstructed image is defined similarly to a 'horizontal×vertical' resolution representation, which is the conventional display resolution representation manner familiar to the public, so that a comparison between the resolution of the hologram reconstructed image and the conventional display resolution or a comparison between the resolution of the hologram reconstructed image and a resolution of a spatial light modulator (SLM) is easy.

FIG. 1 is a view illustrating a hologram reconstructed image optically reconstructed on a space by a holographic display (or a holographic display apparatus).

The holographic display (or the holographic display apparatus) includes a spatial light modulator (SLM). The spatial light modulator (SLM) has addressable pixels, and a case in which a resolution of the spatial light modulator (SLM) is M×N is illustrated in FIG. 1.

A method and an apparatus for measuring a spatial resolution in an image quality of a hologram reconstructed image optically reconstructed on a space by the holographic display (or the holographic display apparatus) are described. The spatial resolution includes a horizontal spatial resolution and a vertical spatial resolution.

Since the hologram reconstructed image is an image formed by continuous wavefronts on the space, the hologram reconstructed image may not be easily measured as in the resolution depending on the number of pixels of the conventional display.

The hologram reconstructed image is positioned on a space spaced apart from the holographic display (or the holographic display apparatus) by a predetermined distance by spatial elements of horizontality, verticality, a distance, and a viewing angle. With respect to dots (or lines), which are minimum representation elements constituting the hologram reconstructed image, a spatial resolution of the hologram reconstructed image is defined on the basis of a resolving power to distinguish adjacent dots (or lines) from each other.

Figure 2:
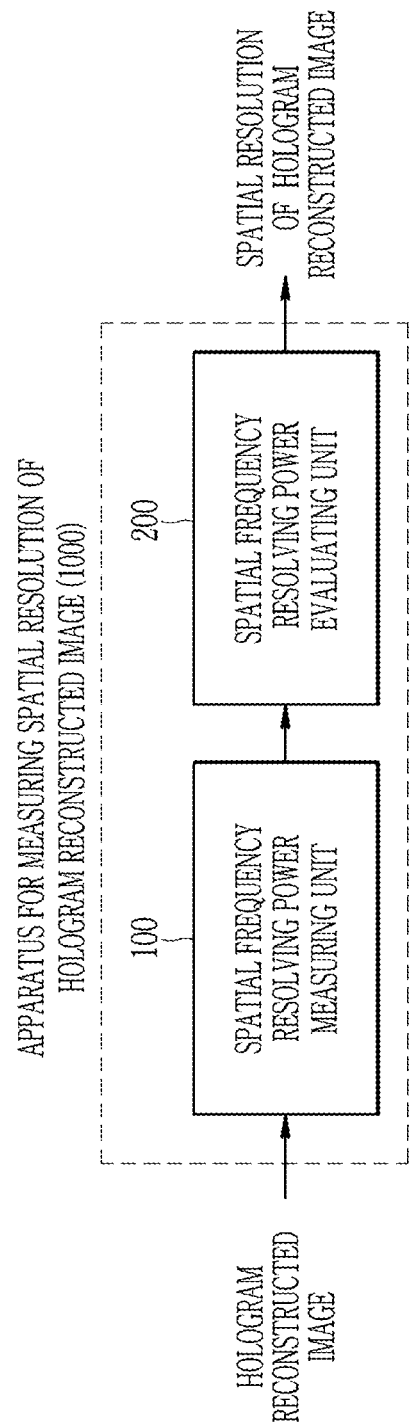
FIG. 2 is a view illustrating an apparatus for measuring a spatial resolution according to an exemplary embodiment of the present invention.

FIG. 2 is a view illustrating an apparatus (or a system) for measuring a spatial resolution according to an exemplary embodiment of the present invention. In detail, the apparatus 1000 for measuring a spatial resolution may include a spatial frequency resolving power measuring unit 100 and a spatial frequency resolving power evaluating unit 200. The apparatus 1000 for measuring a spatial resolution may be a separate apparatus different from the holographic display apparatus.

The spatial frequency resolving power measuring unit 100 receives a hologram reconstructed image optically reconstructed on the space. In addition, the spatial frequency resolving power measuring unit 100 measures spatial frequency resolving power information of the received hologram reconstructed image.

The spatial frequency resolving power evaluating unit 200 receives the measured spatial frequency resolving power information, and evaluates the spatial frequency resolving power information of the hologram reconstructed image. In addition, through this, the spatial frequency resolving power evaluating unit 200 outputs the spatial resolution of the hologram reconstructed image. In detail, the spatial frequency resolving power evaluating unit 200 may evaluate the spatial resolution of the hologram reconstructed image using spatial frequency resolving powers (for example, spatial frequency resolving powers for the horizontal direction of the hologram reconstructed image and spatial frequency resolving powers for the vertical direction of the hologram reconstructed image) measured at each of spatial positions.

Figure 3:
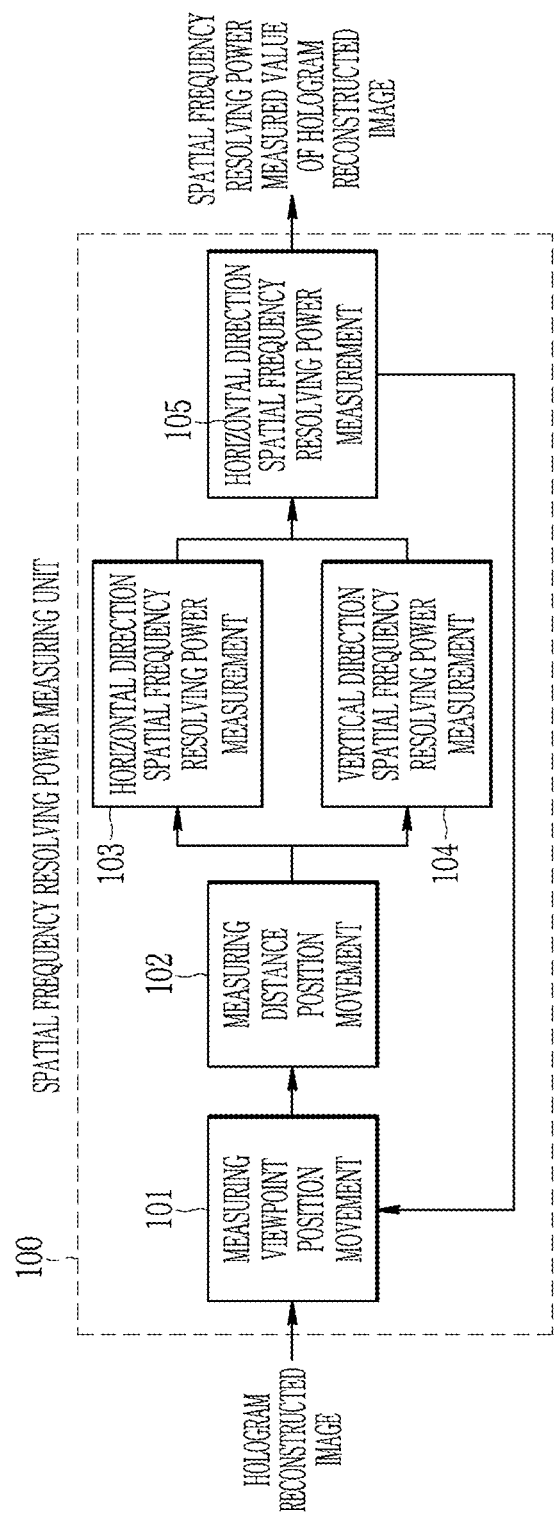
FIG. 3 is a view illustrating a spatial frequency resolving power measuring unit according to an exemplary embodiment of the present invention.

FIG. 3 is a view illustrating a spatial frequency resolving power measuring unit according to an exemplary embodiment of the present invention.

The spatial frequency resolving power measuring unit 100 for measuring the spatial frequency resolving power of the hologram reconstructed image may include a first position moving unit 101, a second position moving unit 102, a first resolving power measuring unit 103, a second resolving power measuring unit 104, and a recording control unit 105.

The first position moving unit 101 has a measuring viewpoint position moving function. In detail, the first position moving unit 101 may move a position of a measuring instrument so that a viewpoint may be set within a predetermined viewing angle range in the horizontal or vertical direction on the basis of a central optical axis of an exit pupil of a holographic display system (or a holographic display apparatus). Here, the measuring instrument (for example, a camera, a sensor, or the like) may be included in the spatial frequency resolving power measuring unit 100.

The second position moving unit 102 has a measuring distance position moving function. In detail, the second position moving unit 102 may change a measuring position depending on a reconstructed distance of the hologram reconstructed image so that a spatial frequency resolving power depending on a hologram reconstructed distance may be measured. For example, the second position moving unit 102 may change the measuring position so as to be focused on an image of each position. A physical position of the measuring instrument may be adjusted or a focal length of a lens included in the measuring instrument may be adjusted. Here, the hologram reconstructed distance means a distance from the exit pupil of the holographic display system (or the hologram display apparatus) to the hologram reconstructed image. In the present specification, the reconstructed distance means a reconstructed distance.

The first resolving power measuring unit 103 has a horizontal direction frequency resolving power measuring function. In detail, the first resolving power measuring unit 103 may measure a spatial frequency resolving power in the horizontal direction with respect to the hologram reconstructed image.

The second resolving power measuring unit 104 has a vertical direction frequency resolving power measuring function. In detail, the second resolving power measuring unit 104 may measure a spatial frequency resolving power in the vertical direction with respect to the hologram reconstructed image.

The recording control unit 105 has a spatial frequency resolving power recording control function. In detail, the recording control unit 105 may record spatial frequency resolving power information measured by the first resolving power measuring unit 103 and the second resolving power measuring unit 104 at each specific position, in the viewpoint determined by the first position moving unit 101 and the distance determined by the second position moving unit 102. Here, the measured spatial frequency resolving power information may include spatial frequency resolving power information for the horizontal direction of the hologram reconstructed image and spatial frequency resolving power information for the vertical direction of the hologram reconstructed image. Then, the recording controlling unit 105 may perform a control so that spatial frequency resolving power measurement of the hologram reconstructed image is repeatedly conducted after position movement by a predetermined viewpoint and distance is again repeated.

The spatial frequency resolving power measuring unit 100 outputs a spatial frequency resolving power measured value of the hologram reconstructed image.

Figure 4:
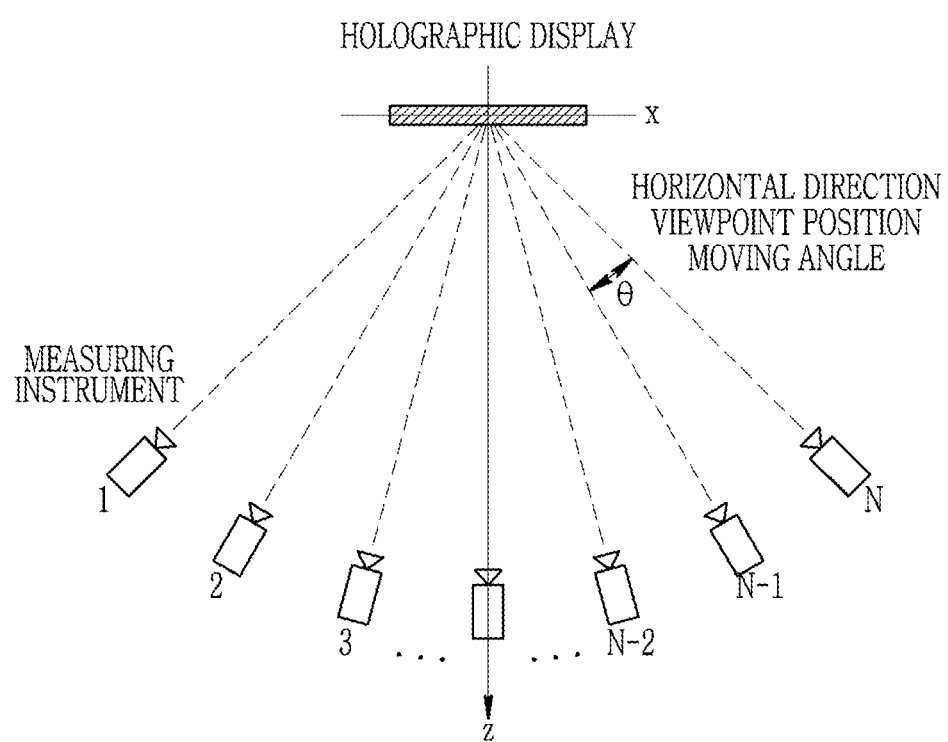
FIG. 4 is a view a measuring viewpoint position moving function according to an exemplary embodiment of the present invention.

FIG. 4 is a view a measuring viewpoint position moving function according to an exemplary embodiment of the present invention. In detail, a configuration for any viewpoints in a horizontal direction viewing angle range is illustrated in FIG. 4.

The measuring viewpoint position moving function described above is for the apparatus 1000 for measuring a spatial resolution to measure the spatial resolution through an effective spatial frequency resolving power analysis, within a viewing angle range having a continuous motion parallax, which is one of features provided by the holographic display (or the holographic display apparatus). In FIG. 4, a case in which the number of measuring viewpoints changed in the horizontal direction is N and an angle for position movement in the horizontal direction (an angle corresponding to a predetermined interval between spatial positions at which measurement is performed) is 8 is illustrated. In FIG. 4, an x-axis indicates the horizontal direction (or a transversal direction) of the holographic display (or the SLM), a y-axis indicates the vertical direction (or a longitudinal direction) of the holographic display (or the SLM), and a z-axis indicates a distance (for example, a distance from the center of the SLM to the measuring instrument). The SLM illustrated in FIG. 1 has M pixels in an x-axis direction (or the transversal direction) and has N pixels in a y-axis direction (or the longitudinal direction).

A hologram motion parallax has a continuous parallax in images of viewpoints viewed at different horizontal and vertical positions within a viewing angle range. However, actually, due to a limitation of optical performance of the holographic display (or the holographic display apparatus), holographic image reconstruction performance of the holographic display (or the holographic display apparatus) may have different image quality differences even in the viewing angle range. Therefore, the spatial frequency resolving power measuring unit 100 performs measurement of a resolution at spatial positions having a predetermined interval in the horizontal and vertical direction within the viewing angle range in order to effectively measure a spatial resolution.

In FIG. 4, position movement of viewpoints changed in the horizontal direction within a horizontal viewing angle range is illustrated. In a manner that is the same as or similar to the method illustrated in FIG. 4, position movement of viewpoints changed in the vertical direction within a vertical viewing angle range may also be considered.

When a plane of a hologram reconstructed image measured in a viewpoint of a viewing angle position changed in each of the horizontal and vertical directions and an optical axis of the measuring instrument (for example, a central axis of the camera) are perpendicular to each other, measurement may be more accurately performed. Here, the measuring instrument may be included in the spatial frequency resolving power measuring unit 100. To this end, in the case in which the holographic display (or the holographic display apparatus) optically reconstructs the hologram, hologram data may be processed so that spatial phase-shift in the horizontal and vertical directions is made. That is, the spatial phase-shift in the horizontal and vertical directions may be applied to the hologram data. Through this, a light wave of hologram reconstruction may be propagated from a central optical axis of the holographic display (or the holographic display apparatus) to an off-axis. When the holographic display apparatus reconstructs the spatially phase-shifted hologram data, the apparatus 1000 for measuring a spatial resolution measures the spatially phase-shifted hologram data. The following Equation 1 represents a numerical calculating process of generating the spatial phase-shift in the horizontal and vertical directions with respect to the hologram data.

$$h'(u, v) = h(u, v) \otimes e^{\frac{-j\pi}{\lambda}\{(x-p_x)+(y-p_y)\}} \quad \text{(Equation 1)}$$

In Equation 1, h(u,v) indicates the hologram data, $p_x$ and $p_y$ indicate phase-shift values in the horizontal and vertical directions, h'(u,v) indicates the spatially phase-shifted hologram data, and $\otimes$ indicates a convolution operator. In Equation 1, (x, y) indicates a pixel coordinate in the horizontal and vertical directions, and λ indicates a wavelength of a light source. That is, the hologram data (h(u,v)) is converted into the hologram data (h'(u,v)) on the basis of Equation 1.

The spatial frequency resolving power measuring unit 100 may measure a spatial frequency resolving power for the horizontal direction of the hologram reconstructed image and a spatial frequency resolving power for the vertical direction of the hologram reconstructed image, at spatial positions (measuring positions) having a predetermined interval in at least one of the horizontal and vertical directions within the viewing angle range of the hologram reconstructed image. In detail, spatial frequency resolving power measured data measured at spatial positions having a predetermined interval in the horizontal and vertical directions within a viewing angle range of a motion parallax of the holographic display (or the holographic display apparatus) may be represented by the following Equation 2. That is, the spatial frequency resolving power measuring unit 100 may average contrast modulation values corresponding to spatial frequency resolving powers measured at the spatial positions (the measuring positions) to obtain an average value.

$$A_\theta(p) = \frac{1}{N_\theta} \sum_\theta C_\theta(p) \text{ for } \theta = -\theta_v, \ldots, \theta_v \quad \text{(Equation 2)}$$

Here, a viewing angle θ (for example, θ of FIG. 4) has a motion parallax within a maximum viewing angle range [−$θ_v$, $θ_v$] provided by the holographic display (or the holographic display apparatus).

Phase-shift is applied to reconstructed waves of the hologram so that an optical axis corresponding to each viewing angle forms a normal line of a plane of the hologram reconstructed image. A resolving power of the hologram reconstructed image may be evaluated as (or correspond to) a contract modulation output value (C(p)) for square wave input patterns having a spatial frequency p. In Equation 2, $C_\theta(p)$ indicates values of C(p) depending on different viewing angles, and $A_\theta(p)$ indicates an average value of $C_\theta(p)$ depending on a change in a viewing angle within a viewing angle range. In Equation 2, $N_\theta$ indicates the number of measuring viewpoints changed in the horizontal direction (or the vertical direction) (or the number of spatial measuring positions).

Figure 5:
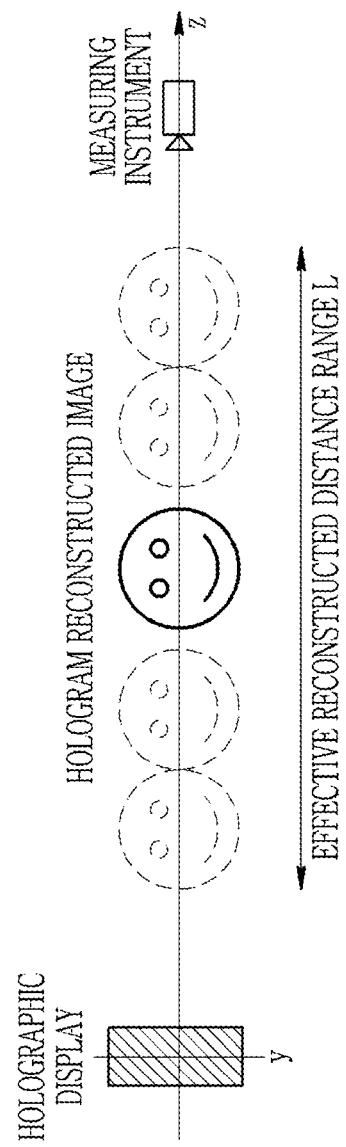
FIG. 5 is a view a measuring distance position moving function according to an exemplary embodiment of the present invention.

FIG. 5 is a view a measuring distance position moving function according to an exemplary embodiment of the present invention. In detail, a configuration for a hologram reconstructed image within an effective reconstructed distance is illustrated in FIG. 5. In FIG. 5, an x-axis indicates the horizontal direction (or a transversal direction) of the holographic display (or the SLM), a y-axis indicates the vertical direction (or a longitudinal direction) of the holographic display (or the SLM), and a z-axis indicates a distance (for example, a distance from the center of the SLM to the measuring instrument).

The apparatus 1000 for measuring a spatial resolution (or the spatial frequency resolving power measuring unit 100) may change a distance of the hologram reconstructed image optically reconstructed on the space (for example, change a position of the measuring instrument) in order to measure the spatial resolution. Through this, the apparatus 1000 for measuring a spatial resolution (or the spatial frequency resolving power measuring unit 100) may obtain a statistically significant average spatial resolution value with respect to the hologram reconstructed image through measurement of a spatial frequency resolving power that may be changed depending on a reconstructed distance from the holographic display (or the holographic display apparatus).

The holographic display (or the holographic display apparatus) may theoretically have an infinite hologram reconstructed distance. However, the holographic display (or the holographic display apparatus) may actually provide a hologram reconstructed image of a predetermined quality or more only within a limited reconstructed distance due to a limitation of performance of an optical component and apparatus, structural characteristics of the holographic display (or the holographic display apparatus), and the like.

The apparatus 1000 for measuring a spatial resolution (or the spatial frequency resolving power measuring unit 100) may measure spatial frequency resolving powers of a plurality of hologram reconstructed image per predetermined distance interval within an effective reconstructed distance in consideration of a difference between a spatial frequency resolving powers depending on a change in the reconstructed distance of the hologram reconstructed image of the holographic display (or the holographic display apparatus). Then, the apparatus 1000 for measuring a spatial resolution (or the spatial frequency resolving power measuring unit 100) may statistically obtain an average spatial resolution value at various reconstructed distances.

A method illustrated in FIG. 5 has the same principle (or approach method) as that of the method illustrated in FIG. 4 (that is, a method of considering an average value of spatial frequency resolving power measured values within the viewing angle range having the continuous motion parallax of the holographic display).

The spatial frequency resolving power measuring unit 100 may measure spatial frequency resolving powers for the horizontal direction of the hologram reconstructed image and spatial frequency resolving powers for the vertical direction of the hologram reconstructed image, with respect to each of a plurality of reconstructed distances of the hologram reconstructed image. In detail, spatial frequency resolving power measured data measured per predetermined distance interval within an effective reconstructed distance section $[L_{min}\ L_{max}]$ of the holographic display (or the holographic display apparatus) may be represented by the following Equation 3.

That is, the spatial frequency resolving power measuring unit 100 may average contrast modulation values corresponding to spatial frequency resolving powers measured with respect to the plurality of reconstructed distances to obtain an average value.

$$A_L(p) = \frac{1}{N_L} \sum_L C_L(p) \text{ for } L = L_{min}, \ldots, L_{max} \quad \text{(Equation 3)}$$

In Equation 3, a range of the reconstructed distance L is $[L_{min}\ L_{max}]$. In Equation 3, $C_L(p)$ indicates spatial resolving power measured values at different reconstructed distance positions, and $A_L(p)$ indicates an average value of $C_L(p)$ depending on a change in the reconstructed distance within an effective reconstructed distance section. In Equation 3, $N_L$ indicates the number of measured distances (or the number of reconstructed distances) changed depending on position movement.

Figure 6A:
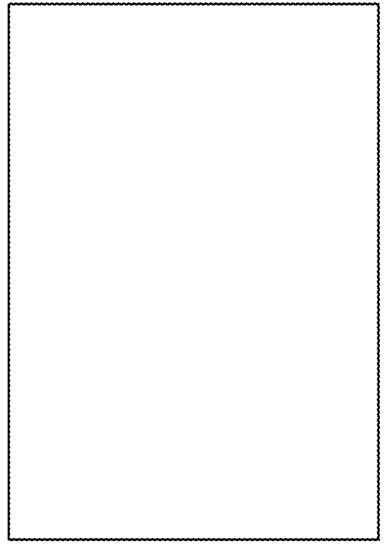
FIGS. 6A and 6B are views illustrating horizontal resolving power measuring input patterns for measuring a horizontal spatial frequency resolving power and a photographing result image for the horizontal resolving power measuring input patterns, according to an exemplary embodiment of the present invention.
Figure 6B:
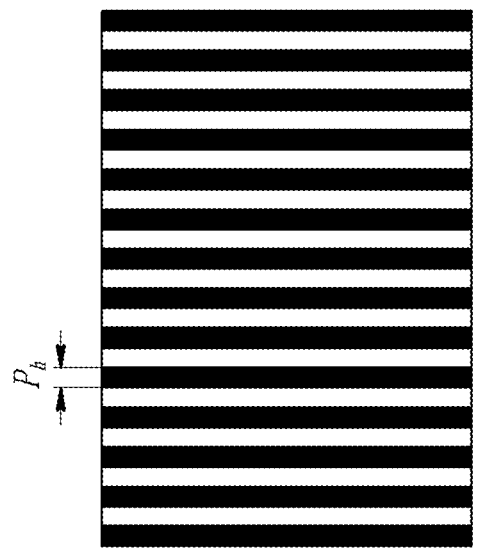
Figure 8:
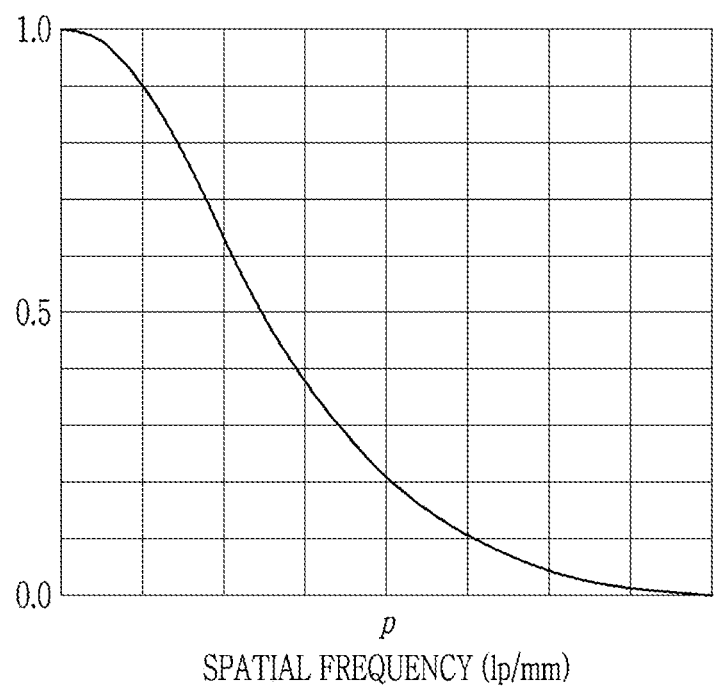
FIG. 8 is a view illustrating a waveform of a modulation transfer function (MTF) according to an exemplary embodiment of the present invention.

FIGS. 6A and 6B are views illustrating horizontal resolving power measuring input patterns for measuring a horizontal spatial frequency resolving power and a photographing result image for the horizontal resolving power measuring input patterns. FIGS. 7A and 7B are views illustrating vertical resolving power measuring input patterns for measuring a vertical spatial frequency resolving power and a photographing result image for the vertical resolving power measuring input patterns. FIG. 8 is a view illustrating a waveform of a modulation transfer function (MTF). In detail, a curved line of a contract modulation value or a modulation transfer function (MTF) depending on a change in a spatial frequency is illustrated in FIG. 8.

In detail, contrast modulation measuring patterns consisting of line-pairs of black bars and white bars having predetermined line-widths in the horizontal direction is illustrated in FIG. 6A, and a hologram reconstructed image result for the contrast modulation measuring patterns is illustrated in FIG. 6B.

In detail, contrast modulation measuring patterns consisting of line-pairs of black bars and white bars having predetermined line-widths in the vertical direction is illustrated in FIG. 7A, and a hologram reconstructed image result for the contrast modulation measuring patterns is illustrated in FIG. 7B.

When widths of the black bar and the white bar (for example, a horizontal width $P_h$ and a vertical width $P_v$) are changed, changed spatial frequency patterns in the horizontal and vertical directions are generated. The spatial frequency means a change ratio of brightness and darkness on the space, and specifically, may mean a change ratio in the black bars and the white bars distributed in the horizontal direction or the vertical direction. A contrast value C(p) output with respect to these patterns is defined as represented by the following Equation 4 on the basis of a contrast value $I_w$ of the white bars and a contrast value $I_k$ of the black bars.

$$C(p) = \frac{I_W - I_K}{I_W + I_K} \quad \text{(Equation 4)}$$

A contrast modulation value output depending on a change in the spatial frequency p is called a modulation transfer function (MTF), and a general waveform of the MTF is as illustrated in FIG. 8. The modulation transfer function (MTF) indicates a relationship between the spatial frequencies and contrast modulation.

In the holographic display (or the holographic display apparatus), a spatial frequency input of the contrast modulation value is the number of pairs of bar patterns per mm on a space in which a target object is positioned. Sizes of the white or black bar patterns may be converted into the number of pixels on hologram data input to the holographic display (or the holographic display apparatus) depending on a pixel-pitch of the spatial light modulator (SLM) of the holographic display (or the holographic display apparatus)

and an image output magnification of the holographic display (or the holographic display apparatus) (for example, an enlarged image output magnification or a reduced image output magnification).

The spatial frequency resolving power evaluating unit 200 included in the apparatus 1000 for measuring a spatial resolution that measures the spatial resolution of the hologram reconstructed image receives a spatial resolving power measuring result of square wave patterns divided and input in the horizontal direction and the vertical direction at positions of different viewing angles and different reconstructed distances, in a modulation transfer function (MTF) form. In detail, the spatial frequency resolving power evaluating unit 200 may receive $A_\theta(p)$ of Equation 2 or $A_L(p)$ of Equation 3 with respect to each of the horizontal direction and the vertical direction of the hologram reconstructed image from the spatial frequency resolving power measuring unit 100. Then, the spatial frequency resolving power evaluating unit 200 calculates a significant average spatial resolution value of the hologram reconstructed image through a statistic evaluating process for the received information.

The spatial frequency resolving power evaluating unit 200 may derive a significant spatial resolution value using horizontal and vertical spatial frequency resolving power measured values measured at different positions on the space depending on viewing angles and reconstructed distances in the reconstructible entire space of the hologram reconstructed image. To this end, the spatial frequency resolving power evaluating unit 200 may designate a target quality on the basis of the contrast modulation. It is assumed that a contrast modulation value corresponding to the designated target quality is $C_T$.

The spatial frequency resolving power evaluating unit 200 may determine measured values nearest to the target quality value $C_T$ (or contrast modulation values corresponding to the measured values) among spatial frequency resolving power measured values depending on the viewing angles (for example, FIG. 4) and the reconstructed distances (for example, FIG. 5) (or contrast modulation values corresponding to the spatial frequency resolving power measured values), and obtain an average $p_m$ and a standard deviation $p_\delta$ of spatial frequencies corresponding to the determined measured values (or the contrast modulation values corresponding to the measured values). That is, the contrast modulation values corresponding to the measured spatial frequency resolving powers may be used to calculate the average value $p_m$ and the standard deviation $p_\delta$. The spatial frequency resolving power evaluating unit 200 may obtain the average value $p_m$ and the standard deviation $p_\delta$ with respect to each of the horizontal direction and the vertical direction of the hologram reconstructed image.

A section in which about 95% of data exist according to a standard normal probability distribution for the average value $p_m$ and the standard deviation $p_\delta$ is $[p_m-2p_\delta, p_m+2p_\delta]$ in the case in which k=2. In the case in which k=1, about 68% of data exits in a section of $[p_m-p_\delta, p_m+p_\delta]$. Such a process is illustrated in FIG. 9.

Figure 9:
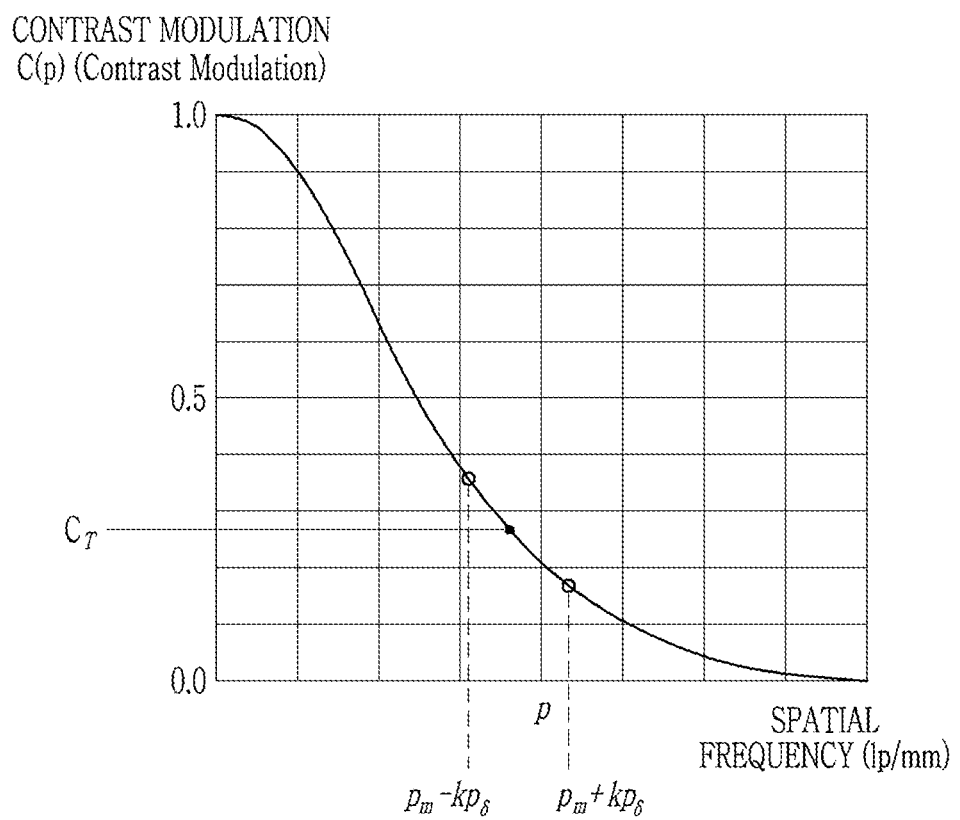
FIG. 9 is a view illustrating a method for deriving a statistically significant spatial frequency section based on a spatial frequency resolving power measuring average value according to an exemplary embodiment of the present invention.

FIG. 9 is a view illustrating a method for deriving a statistically significant spatial frequency section based on a spatial frequency resolving power measuring average value according to an exemplary embodiment of the present invention.

A spatial frequency section in which predetermined data exists according to the standard normal probability distribution for the average value $p_m$ and the standard deviation $p_\delta$ is $[p_m-kp_\delta, p_m+kp_\delta]$. Here, k is a constant.

Figure 10:
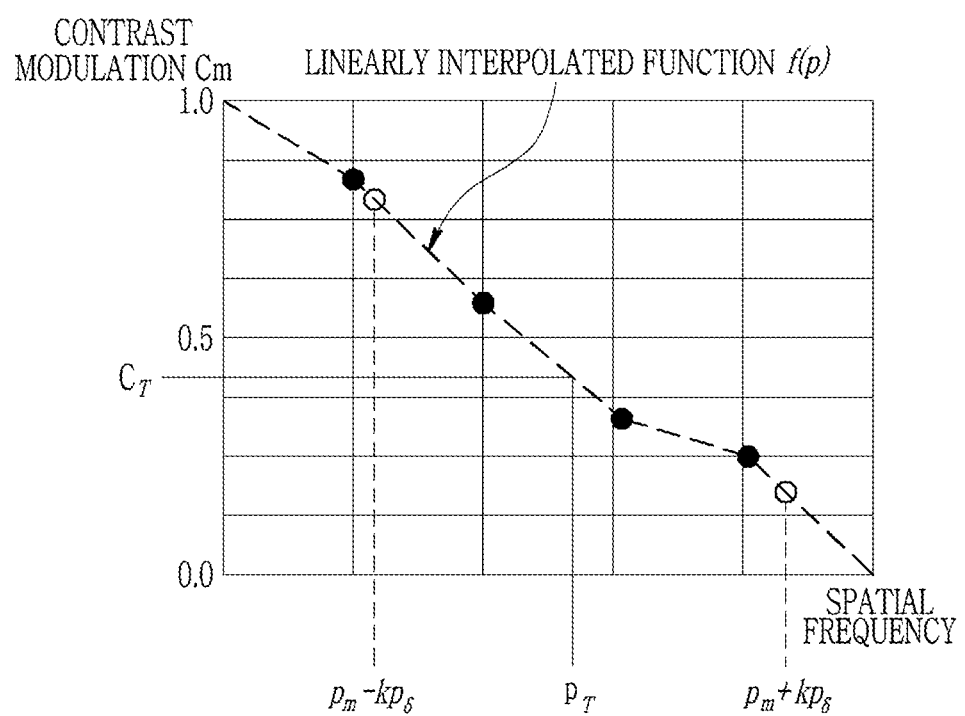
FIG. 10 is a view illustrating a method for obtaining an effective spatial frequency through local linear interpolation within a statistically significant spatial frequency section according to an exemplary embodiment of the present invention.

FIG. 10 is a view illustrating a method for obtaining an effective spatial frequency through local linear interpolation within a statistically significant spatial frequency section according to an exemplary embodiment of the present invention. In detail, a contract modulation value Cm for linear interpolation is illustrated in FIG. 10.

The spatial frequency resolving power evaluating unit 200 may obtain a function f(p) using the measured spatial frequency resolving powers. In detail, the spatial frequency resolving power evaluating unit 200 may obtain a function f(p) linearly interpolated within a locally focused section using spatial frequency resolving power measured average values (for example, $A_\theta(p)$ of Equation 2, $A_L(p)$ of Equation 3, or the like) actually measured within a spatial frequency section corresponding to the case in which k=1 or the case in which k=2. For example, the spatial frequency resolving power evaluating unit 200 may linearly interpolate the modulation transfer function (MTF) using the spatial frequency resolving power measured average values (for example, $A_\theta(p)$ of Equation 2, $A_L(p)$ of Equation 3, or the like) to obtain the function f(p). The spatial frequency resolving power evaluating unit 200 may obtain the function f(p) with respect to each of the horizontal direction and the vertical direction of the hologram reconstructed image.

The spatial frequency resolving power evaluating unit 200 may obtain an effective spatial frequency $P_T$ using a function relation of $C_T=f(p_T)$. In detail, the spatial frequency resolving power evaluating unit 200 may obtain the effective spatial frequency $P_T$ with respect to each of the horizontal direction and the vertical direction of the hologram reconstructed image.

A method for obtaining the effective spatial frequency $P_T$ is illustrated in FIG. 10.

As illustrated in FIG. 10, the linearly interpolated function f(p) is obtained from spatial frequency resolving power measured values limited to the section of $[p_m-kp_\delta, p_m+kp_\delta]$ illustrated in FIG. 9, and the effective spatial frequency $p_T$ is obtained from the linearly interpolated function f(p).

The spatial frequency resolving power evaluating unit 200 may finally obtain the spatial resolution of the hologram reconstructed image in consideration of the spatial frequency resolving power measured values measured in the horizontal direction and the vertical direction in the manner described above and horizontal and vertical resolutions of the spatial light modulator (SLM) belonging to the holographic display (or the holographic display apparatus). In detail, the spatial frequency resolving power evaluating unit 200 may finally evaluate the spatial resolution of the hologram reconstructed image using the resolution of the spatial light modulator (SLM) and the effective spatial frequency of the hologram reconstructed image.

For example, the spatial frequency resolving power evaluating unit 200 may obtain a final spatial resolution of the hologram reconstructed image on the basis of the following Equation 5.

$$\text{Spatial resolution }(H)\text{ in horizontal direction }(H) = \frac{M}{p_T^H} \quad \text{(Equation 5)}$$

$$\text{Spatial resolution }(V)\text{ in vertical direction }(V) = \frac{N}{p_T^V}$$

In Equation 5, M and N indicate, respectively, horizontal and vertical resolutions of the spatial light modulator (SLM) belonging to the holographic display (or the holographic display apparatus) illustrated in FIG. 1. In this case, the resolution means the total number of addressable pixels as described above.

In Equation 5, $p_T^H$ indicates an effective spatial frequency for the horizontal direction of the hologram reconstructed image, and $p_T^V$ indicates an effective spatial frequency for the vertical direction of the hologram reconstructed image. $p_T^H$ and $p_T^V$ may be obtained by the method illustrated in FIG. 10.

$p_T^H$

In Equation 5, a finally obtained spatial resolution H×V of the holographic display (or the holographic display apparatus) generally has a spatial resolution value of H<M and V<N due to a limitation of optical performance of an optical system including the spatial light modulator (SLM), limited diffraction efficiency, and the like.

$C_T$ and k, which are the parameters described above, may be set to appropriate values depending on an application and a use purpose of the corresponding holographic display (or the holographic display apparatus).

As described above, the apparatus 1000 for measuring a spatial resolution may measure and evaluate a spatial resolution of a three-dimensional hologram reconstructed image having a stereoscopic depth by freely designating a reconstructed distance within a predetermined viewing angle range in which a continuous motion parallax, which is a feature of the holographic display (or the holographic display apparatus), is provided. To this end, the apparatus 1000 for measuring a spatial resolution may obtain effective spatial frequencies in the horizontal and vertical directions using spatial frequency resolving power measured values of a hologram reconstructed image reconstructed at any viewpoints and positions depending on the viewing angles and the reconstructed distances. In detail, the apparatus 1000 for measuring a spatial resolution may obtain the effective spatial frequencies in the horizontal and vertical directions through a linear interpolation in a locally focused section within a statistically significant section range, with respect to the spatial frequency resolving power measured values. Then, the apparatus 1000 for measuring a spatial resolution may finally calculate the spatial resolution of the hologram using the effective spatial frequencies.

That is, the apparatus 1000 for measuring a spatial resolution may receive the hologram reconstructed image optically reconstructed from the holographic display (or the holographic display apparatus), and measure and evaluate the spatial resolution of the hologram reconstructed image. In detail, the spatial frequency resolving power measuring unit 100 included in the apparatus 1000 for measuring a spatial resolution may measure spatial frequency resolving powers in the horizontal and vertical directions at any viewpoints and distances by making viewing angles (and reconstructed distances) of the holographic display (or the holographic display apparatus) different from each other with respect to the hologram reconstructed image received from the holographic display (or the holographic display apparatus). The spatial frequency resolving power evaluating unit 200 included in the apparatus 1000 for measuring a spatial resolution may receive the spatial frequency resolving power measured values in the horizontal and vertical directions, analyze and evaluate statistical characteristics for the spatial frequency resolving power measured values, and then obtain the spatial resolution of the hologram reconstructed image.

Figure 11:
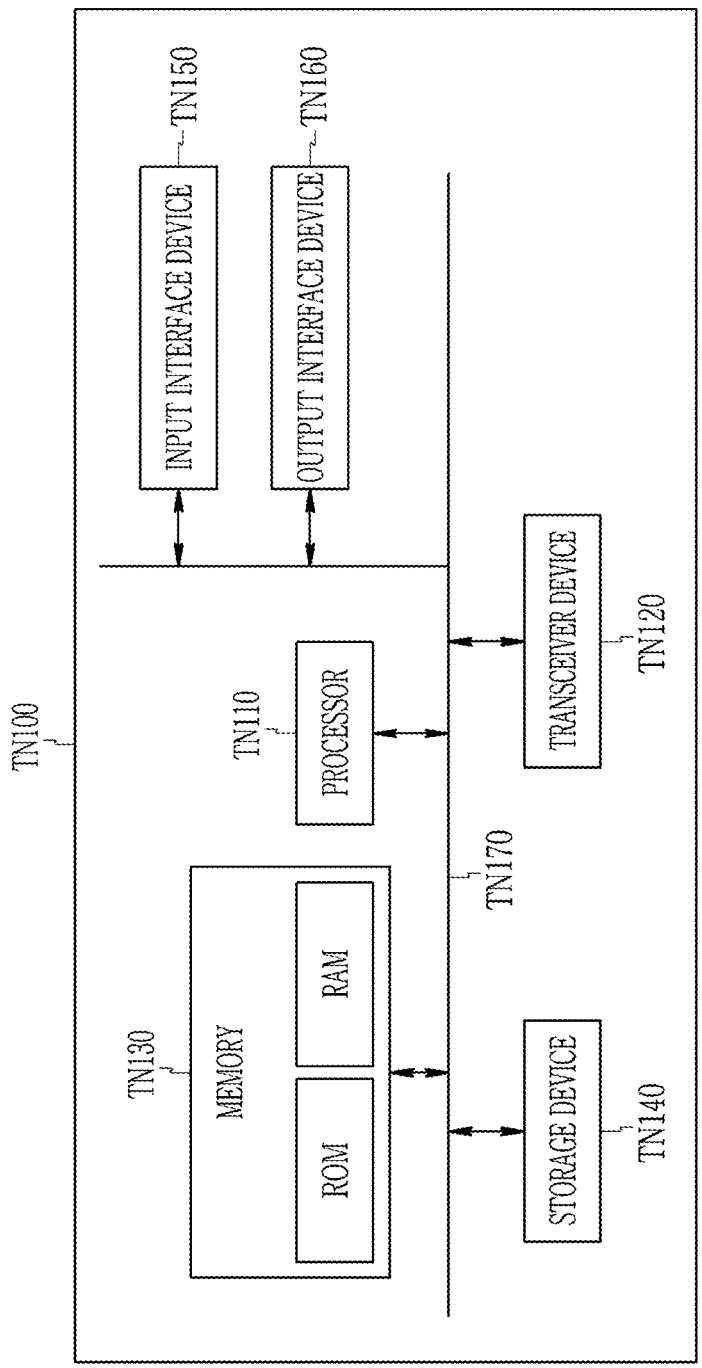
FIG. 11 is a view illustrating a computing apparatus according to an exemplary embodiment of the present invention.

FIG. 11 is a view illustrating a computing apparatus according to an exemplary embodiment of the present invention. The computing apparatus TN100 of FIG. 11 may correspond to the apparatus 1000 for measuring a spatial resolution, the spatial frequency resolving power measuring unit 100, the spatial frequency resolving power evaluating unit 200, the holographic display apparatus, or the like, described in the present specification.

In an exemplary embodiment of FIG. 11, the computing apparatus TN100 may include at least one processor TN110 and a memory TN130. In addition, the computing apparatus TN100 may further include a transceiver device TN120 connected to a network to perform communication, a storage device TN140, an input interface device TN150, an output interface device TN160, and the like. The components included in the computing apparatus TN100 may be connected to each other by a bus TN170 to perform communication with each other.

The processor TN110 may execute a program command stored in at least one of the memory TN130 and the storage device TN140. The processor TN110 may be a central processing unit (CPU), a graphics processing unit (GPU), or a dedicated processor in which the methods according to an exemplary embodiment of the present invention are performed. The processor TN110 may be configured to implement the procedures, the functions, and the methods stated in an exemplary embodiment of the present invention. The processor TN110 may control the respective components of the computing apparatus TN100.

Each of the memory TN130 and the storage device TN140 may store various kinds of information related to the operations of the processor TN110. Each of the memory TN130 and the storage device TN140 may be formed of at least one of a volatile storage medium and a non-volatile storage medium. For example, the memory TN130 may be formed of at least one a read only memory (ROM) and a random access memory (RAM).

The transceiver device TN120 may transmit or receive wired signals or wireless signals.

Meanwhile, an exemplary embodiment of the present invention are not implemented through only the apparatus and/or the method described above, but may also be implemented through programs executing functions corresponding to configurations of an exemplary embodiment of the present invention, a recording medium in which the programs are recorded, and the like. In addition, these implementations may be easily made by a person of ordinary skill in the art to which the present invention pertains from the exemplary embodiment described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for measuring a spatial resolution of a hologram reconstructed image optically reconstructed on a space, comprising:
    a measuring unit measuring first spatial frequency resolving powers for a horizontal direction of the hologram reconstructed image and second spatial frequency resolving powers for a vertical direction of the hologram reconstructed image at first spatial positions having a predetermined interval in horizontal and vertical directions within a viewing angle range of the hologram reconstructed image; and an evaluating unit evaluating the spatial resolution of the hologram reconstructed image using the first spatial frequency resolving powers and the second spatial frequency resolving powers measured at each of the first spatial positions.

2. The apparatus for measuring a spatial resolution of a hologram reconstructed image of claim 1, wherein:
spatial phase-shift in the horizontal and vertical directions is applied to first hologram data corresponding to the hologram reconstructed image.

3. The apparatus for measuring a spatial resolution of a hologram reconstructed image of claim 2, wherein:
the first hologram data are converted into second hologram data on the basis of the following Equation 1:

$$h'(u,v) = h(u,v) \otimes e^{\frac{-j\pi}{\lambda}\{(x-p_x)+(y-p_y)\}} \qquad \text{[Equation 1]}$$

where h(u,v) is the first hologram data, $p_x$ is a phase-shift value in the horizontal direction, $p_y$ a phase-shift value in the vertical direction, h'(u,v) is the second hologram data, $\otimes$ is an convolution operator, $\lambda$ is a wavelength of a light source, and (x, y) is a pixel coordinate in the horizontal direction and the vertical direction.

4. The apparatus for measuring a spatial resolution of a hologram reconstructed image of claim 1, wherein:
the measuring unit
averages first contrast modulation values corresponding to the first spatial frequency resolving powers measured at each of the first spatial positions to obtain a first average value.

5. The apparatus for measuring a spatial resolution of a hologram reconstructed image of claim 4, wherein:
the measuring unit
obtains the first average value on the basis of the following Equation 1:

$$A_\theta(p) = \frac{1}{N_\theta}\sum C_\theta(p) \qquad \text{[Equation 1]}$$

where $A_\theta(p)$ is the first average value, $N_\theta$ is the number of first spatial positions, p is a spatial frequency, and $C_\theta(p)$ is the first contrast modulation value depending on p.

6. The apparatus for measuring a spatial resolution of a hologram reconstructed image of claim 1, wherein:
the measuring unit
measures third spatial frequency resolving powers for the horizontal direction of the hologram reconstructed image and fourth spatial frequency resolving powers for the vertical direction of the hologram reconstructed image, with respect to each of a plurality of reconstructed distances of the hologram reconstructed image.

7. The apparatus for measuring a spatial resolution of a hologram reconstructed image of claim 6, wherein:
the measuring unit
averages first contrast modulation values corresponding to the third spatial frequency resolving powers measured with respect to each of the plurality of reconstructed distances to obtain a first average value.

8. The apparatus for measuring a spatial resolution of a hologram reconstructed image of claim 7, wherein:
the measuring unit
obtains the first average value on the basis of the following Equation 1:

$$A_L(p) = \frac{1}{N_L}\sum C_L(p) \qquad \text{[Equation 1]}$$

where $A_L(p)$ is the first average value, $N_L$ is the number of reconstructed distances, p is a spatial frequency, and $C_L(p)$ is the first contrast modulation value depending on p.

9. The apparatus for measuring a spatial resolution of a hologram reconstructed image of claim 4, wherein:
the evaluating unit
linearly interpolates a modulation transfer function indicating a relationship between spatial frequencies and contrast modulation using the first average value to obtain a first function, and obtains a first effective spatial frequency corresponding to a preset target contrast modulation value using the first function.

10. The apparatus for measuring a spatial resolution of a hologram reconstructed image of claim 9, wherein:
the evaluating unit
calculates an average $p_m$ and a standard deviation $p_\delta$ of the spatial frequencies using the first contrast modulation values for each of the first spatial positions, and
the first effective spatial frequency exists in a section of $[p_m-kp_\delta, p_m+kp_\delta]$ (here, k is a constant).

11. The apparatus for measuring a spatial resolution of a hologram reconstructed image of claim 9, wherein:
the evaluating unit
evaluates the spatial resolution of the hologram reconstructed image using a resolution of a spatial light modulator included in a holographic display apparatus reconstructing the hologram reconstructed image and the first effective spatial frequency.

12. The apparatus for measuring a spatial resolution of a hologram reconstructed image of claim 11, wherein:
the spatial resolution of the hologram reconstructed image includes a first spatial resolution for the horizontal direction of the hologram reconstructed image and a second spatial resolution for the vertical direction of the hologram reconstructed image, and
the evaluating unit
obtains the first spatial resolution on the basis of the following Equation 1:

$$H = \frac{M}{p_T^H} \qquad \text{[Equation 1]}$$

where H is the first spatial resolution, $p_T^H$ is the first effective spatial frequency, M is a resolution of the spatial light modulator in the horizontal direction.

13. A method for measuring a spatial resolution of a hologram reconstructed image optically reconstructed on a space by an apparatus for measuring a spatial resolution, comprising:
measuring first spatial frequency resolving powers for a horizontal direction of the hologram reconstructed image at spatial positions having a predetermined interval in at least one of horizontal and vertical directions within a viewing angle range of the hologram reconstructed image;

obtaining a first function having a relationship between spatial frequencies and contrast modulation using the first spatial frequency resolving powers measured at each of the spatial positions; and evaluating a first spatial resolution for the horizontal direction of the hologram reconstructed image using the first function.

14. The method for measuring a spatial resolution of a hologram reconstructed image of claim 13, wherein:

the measuring includes averaging first contrast modulation values corresponding to the first spatial frequency resolving powers measured at each of the spatial positions to obtain a first average value.

15. The method for measuring a spatial resolution of a hologram reconstructed image of claim 14, wherein:

the obtaining of the first function includes linearly interpolating a modulation transfer function using the first average value to obtain the first function.

16. The method for measuring a spatial resolution of a hologram reconstructed image of claim 15, wherein:

the evaluating of the first spatial resolution includes:

obtaining a first effective spatial frequency corresponding to a preset target contrast modulation value using the first function; and calculating the first spatial resolution using a resolution, in the horizontal direction, of a spatial light modulator belonging to a holographic display apparatus reconstructing the hologram reconstructed image and the first effective spatial frequency.

17. The method for measuring a spatial resolution of a hologram reconstructed image of claim 16, wherein:

the calculating of the first spatial resolution includes:

calculating the first spatial resolution on the basis of the following Equation 1:

$$H = \frac{M}{p_T^H}$$ [Equation 1]

where H is the first spatial resolution, $p_T^H$ is the first effective spatial frequency, M is a resolution of the spatial light modulator in the horizontal direction.

18. The method for measuring a spatial resolution of a hologram reconstructed image of claim 13, further comprising:

measuring second spatial frequency resolving powers for the horizontal direction of the hologram reconstructed image with respect to each of a plurality of reconstructed distances of the hologram reconstructed image; and averaging first contrast modulation values corresponding to the second spatial frequency resolving powers measured with respect to each of the plurality of reconstructed distances to obtain a first average value.

19. An apparatus for measuring a spatial resolution of a hologram reconstructed image optically reconstructed on a space, comprising:

a measuring unit measuring first spatial frequency resolving powers for a horizontal direction of the hologram reconstructed image with respect to each of a plurality of reconstructed distances of the hologram reconstructed image; and an evaluating unit obtaining a first function having a relationship between spatial frequencies and contrast modulation using the first spatial frequency resolving powers measured with respect to each of the plurality of reconstructed distances and evaluating a first spatial frequency resolution for the horizontal direction of the hologram reconstructed image using the first function, wherein the measuring unit averages first contrast modulation values corresponding to the first spatial frequency resolving powers measured with respect to each of the plurality of reconstructed distances to obtain a first average value, and wherein the evaluating unit linearly interpolates a modulation transfer function using the first average value to obtain the first function.

* * * * *